United States Patent
Wang et al.

(10) Patent No.: US 11,833,777 B2
(45) Date of Patent: Dec. 5, 2023

(54) HIGH-STRENGTH DOUBLE-SIDED STAINLESS STEEL CLAD SHEET AND MANUFACTURING METHOD THEREFOR

(71) Applicant: BAOSHAN IRON & STEEL CO., LTD., Shanghai (CN)

(72) Inventors: Zhiyu Wang, Shanghai (CN); Sihai Jiao, Shanghai (CN); Shaoming Qiang, Shanghai (CN); Huawei Zhang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 0 days.

(21) Appl. No.: 17/055,041

(22) PCT Filed: May 15, 2019

(86) PCT No.: PCT/CN2019/087080
§ 371 (c)(1),
(2) Date: Nov. 12, 2020

(87) PCT Pub. No.: WO2019/219031
PCT Pub. Date: Nov. 21, 2019

(65) Prior Publication Data
US 2021/0213709 A1 Jul. 15, 2021

(30) Foreign Application Priority Data
May 16, 2018 (IN) .......................... 201810468895.X (51) Int. Cl.
*B32B 15/01* (2006.01)
*C21D 6/00* (2006.01)
(Continued)

(52) U.S. Cl.
CPC ............ *B32B 15/011* (2013.01); *C21D 6/004* (2013.01); *C21D 8/0205* (2013.01);
(Continued)

(58) Field of Classification Search
None
See application file for complete search history.

(56) References Cited

U.S. PATENT DOCUMENTS

| 4,917,969 A | 4/1990 | Pircher et al. |
| 5,183,198 A | 2/1993 | Tamehiro et al. |
| 2015/0017476 A1* | 1/2015 | Tachibana ................ C21D 1/25 |
| | | 420/84 |

FOREIGN PATENT DOCUMENTS

| CN | 104441822 A | 3/2015 |
| CN | 104760351 A | 7/2015 |

(Continued)

OTHER PUBLICATIONS

Kovach, "High-Performance Stainless Steels", Jan. 1, 2000, Nickel Development Institute, attached cover and pp. 3-5, accessed online Apr. 22, 2022 at nickelinstitute.org/media/1702/highperformancestainlesssteels_11021_. pdf (Year: 2000).*

(Continued)

*Primary Examiner* — Humera N. Sheikh
*Assistant Examiner* — Kim S. Horger
(74) *Attorney, Agent, or Firm* — AMSTER, ROTHSTEIN & EBENSTEIN LLP (57) ABSTRACT

Disclosed in the present invention is a high-strength double-sided stainless steel clad sheet, including a substrate layer, and stainless steel clad layers clad-rolled on double sides of the substrate layer. The substrate layer consists, in mass percent, the chemical elements: C: 0.03-0.12%, $0<Si\leq0.30\%$, Mn: 0.2-1.0%, Al: 0.02-0.04%, Ti: 0.01-0.03%, Nb: 0.005-0.020%, and N: 0.003-0.006%, with the balance being iron and other inevitable impurities. Also disclosed in the present invention is a manufacturing method for the high-strength double-sided stainless steel clad sheet, including the steps of: (1) obtaining the substrate layer and the stainless steel clad layer; (2) billet making; (3) clad-
(Continued)

rolling; and (4) solution annealing and pickling treatment: controlling the solution temperature to be 950-1020° C., and then cooling down to room temperature at an average cooling rate of 20-50° C./s.

10 Claims, 2 Drawing Sheets

(51) Int. Cl.
| | |
|---|---|
| C21D 8/02 | (2006.01) |
| C21D 9/46 | (2006.01) |
| C21D 9/50 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/44 | (2006.01) |

(52) U.S. Cl.
CPC ......... *C21D 8/0226* (2013.01); *C21D 8/0263* (2013.01); *C21D 9/46* (2013.01); *C21D 9/50* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/44* (2013.01); *C21D 2211/002* (2013.01); *C21D 2211/005* (2013.01); *C21D 2211/009* (2013.01)

(56) References Cited

FOREIGN PATENT DOCUMENTS

| | | |
|---|---|---|
| CN | 104988414 A | 10/2015 |
| CN | 105296854 A | 2/2016 |
| CN | 106269961 A | 1/2017 |
| CN | 107226301 A | 10/2017 |
| JP | S6043433 A | 3/1985 |
| JP | 105245658 A | 9/1993 |
| JP | H11152547 A | 6/1999 |
| JP | 2003027140 A | 1/2003 |
| JP | 2016108665 A | 6/2016 |
| JP | 2017061711 A | 3/2017 |
| KR | 20130053706 A | 5/2013 |
| KR | 20160058817 A | 5/2016 |
| WO | 2012/146384 A1 | 11/2012 |

OTHER PUBLICATIONS

English translation of the International Search Report and Written Opinion dated Jul. 23, 2020 in corresponding International Application PCT/SN2019/087080.
Office Action dated Jul. 23, 2021 in corresponding Australian Application No. 2019271821.
Office Action dated Nov. 17, 2021 in corresponding Canadian Application No. 3,099,932.
Office Action dated May 4, 2021 in corresponding European Application No. 19803939.8.
Office Action dated Sep. 12, 2021 in corresponding European Application No. 19803939.8.
Office Action dated Jan. 17, 2022 in corresponding Japanese Application No. 020-564206.
Office Action dated Mar. 30, 2022 in corresponding Korean Application No. 10-2020-7033700.

\* cited by examiner

HIGH-STRENGTH DOUBLE-SIDED STAINLESS STEEL CLAD SHEET AND MANUFACTURING METHOD THEREFOR

TECHNICAL FIELD

The present invention relates to a clad sheet and a manufacturing method therefor, in particular to a stainless steel clad sheet and a manufacturing method therefor.

BACKGROUND

The stainless steel clad sheet is an integral new material having special composite performances Obtained by metallurgical bonding a clad layer on a substrate layer under specific process technology conditions. The stainless steel clad sheet can replace stainless steel to achieve its full performances such as corrosion resistance, heat resistance, hydrogen resistance, wear resistance and brightness, but also has the strength, machinability, weldability and other special performances of carbon steel.

In the prior art, Chinese patent CN105296854A, with the publication date of Feb. 3, 2016, entitled "Cold-rolled double-surface stainless steel composite sheet having excellent comprehensive performances and manufacturing method", has disclosed a cold-rolled double-surface stainless steel composite sheet having excellent comprehensive performances; as the stainless steel composite sheet, by designing an ultra-low carbon steel substrate composited with 304 stainless steel, and carrying out a reasonable heat treatment process, a new material with high elongation, no yield pattern defects, flat surface and excellent formed surface quality can be obtained, and the stainless steel composite sheet is mainly used for decorative panels and fields with higher forming requirements. However, the yield strength and tensile strength of the stainless steel composite sheet are low, and the yield strength is often lower than 200 MPa, so that the stainless steel composite sheet has its limitations when used in cases where there are higher requirements for mechanical properties. With the advancement and application of double-sided stainless steel composite sheet materials, the higher requirements for the performance of stainless steel composite sheets have been put forwarded in the current market, especially in terms of yield strength and surface quality. It is hoped that stainless steel composite sheets can not only meet the requirements of conventional forming and use, but also can have higher yield strength and better surface quality.

Based on this, it is desired to obtain a double-sided stainless steel clad sheet with high strength, good surface quality and corrosion resistance, so as to expand the application field of the stainless steel clad sheet, save raw material alloy resources, and reduce use costs.

SUMMARY

One of the objectives of the present invention is to provide a high-strength double-sided stainless steel clad sheet, which has high strength, good surface quality and corrosion resistance through reasonable composition design, is suitable for applications in panels, storage tanks and other fields, and saves raw material alloy resources, reduces use cost.

In order to achieve the above objectives, the present invention proposes a high-strength double-sided stainless steel clad sheet, which includes a substrate layer and stainless steel clad layers clad-rolled on double sides of the substrate layer; wherein the substrate layer consists of, in mass percent, the chemical elements: C: 0.03-0.12%, 0<Si≤0.30%, Mn: 0.2-1.0%, Al: 0.02-0.04%, Ti: 0.01-0.03%, Nb: 0.005-0.020%, and N: 0.003-0.006%, with the balance being iron and other inevitable impurities. The chemical elements of the substrate layer in mass percent is the chemical elements of a substrate before cladding in mass percent.

In the technical solution of the present invention, the design principles of the chemical elements of the substrate layer are as follows.

C: Carbon is one of the key elements to ensure the strength of steel sheets. The increase in carbon content can increase the strength and hardness of steel. Since the double-sided stainless steel clad sheet is finally subjected to solution treatment, and during the solution treatment, the substrate layer and the stainless steel clad layer undergo high temperature and rapid cooling treatment, so the effect of carbon on the performances of both the substrate layer and the stainless steel clad layer must be considered. Too low carbon content is detrimental to the strength of the substrate layer; and if the carbon content is too high, martensite is easily formed in the substrate layer during heat treatment and rapid cooling, which is unfavorable to the comprehensive mechanical properties of substrate layer and also affects the corrosion resistance of the stainless steel clad layer. Based on this, the inventor of the present invention controls the mass percent of carbon in the substrate layer to 0.03-0.12% to ensure the mechanical properties and elongation performance of the substrate layer and the corrosion resistance of the stainless steel clad layer.

Si: Adding silicon to steel can improve steel purity and deoxidation effect. In addition, silicon plays a role in strengthening solution treatment in steel, but when its mass percent is too high, it is unfavorable to the welding performance of steel. In addition, considering that there is also a certain amount of silicon in the stainless steel clad layer, the inventor of the present invention limits the mass percent of silicon in the substrate layer to 0<Si≤0.30%, so as to ensure that the silicon will not affect the corrosion resistance of the stainless steel clad layer, and the substrate layer has good welding performance.

Mn: The purpose of adding manganese is mainly to increase the strength of steel, and the amount of manganese added mainly depends on the strength level of steel. In addition, manganese can also play a deoxidizing role together with aluminum in steel, and the deoxidizing role of manganese can promote the effective effect of titanium, but excessively high manganese content will reduce the plasticity of steel. Therefore, the inventor of the present invention limits the mass percent of manganese in the substrate layer to 0.2-1.0%.

Al: Aluminum is a strong deoxidizing element. After deoxidation, the excess aluminum and nitrogen in steel can form AlN precipitates, thereby increasing the strength of steel and refining the austenite grain size of steel during heat treatment. In order to ensure that the oxygen content in steel is as low as possible, the inventor of the present invention controls the mass percent of aluminum in the substrate layer to 0.02-0.04%.

Ti: Titanium is a strong carbide forming element. The addition of a small amount of Ti to steel is beneficial to the fixation of N in steel. On the one hand, the formed TiN can refine the original grain size of austenite in the substrate of the high-strength double-sided stainless steel clad sheet of the present invention, on the other hand, can make the grain size of austenite in the substrate layer not excessively grow during the solutioni treatment of the high-strength double-sided stainless steel clad sheet of the present invention. In addition, titanium in steel can also be chemically combined with carbon and sulfur to form TiC, TiS, $Ti_4C_2S_2$, respectively. The carbide/sulfide precipitates of titanium can prevent the grain growth of the material at the relevant position during solution heat treatment and welding, thereby improving the grain size of the substrate layer after solution treatment and the welding performance of the high-strength double-sided stainless steel clad sheet of the present invention. Therefore, the inventor of the present invention controls the mass percent of titanium in the substrate layer to 0.01-0.03%.

Nb: Niobium is a strong carbide forming element. A small amount of niobium is added to the substrate layer to increase the recrystallization temperature. In conjunction with the higher solution treatment temperature in the production process, the grains of the substrate layer cannot grow rapidly after solution treatment, which is conducive to good mechanical properties of the substrate layer. Therefore, the inventor of the present invention controls the mass percent of niobium in the substrate layer to 0.005-0.020%.

N: Nitrogen mainly forms second phase particles with titanium and aluminum to refine grains and improve strength. When the mass percent of N is less than 0.003%, there are too few TiN or AlN precipitates to meet the requirements for grain refinement. When the mass percent of N is too high, the amount of TiN produced is too large and the grains are too coarse, which will affect the mechanical properties of the substrate layer of the high-strength double-sided stainless steel clad sheet of the present invention. Therefore, the inventor of the present invention controls the mass percent of nitrogen in the substrate layer to 0.003-0.006%.

It should be noted that in the technical solution of the present invention, other inevitable impurities are mainly P and S. P and S are harmful impurity elements in steel. Phosphorus will seriously damage the plasticity and toughness of steel sheets. Sulfur will chemically combine with manganese in steel to form plastic inclusions, namely manganese sulfide, which is especially harmful to the transverse plasticity and toughness of steel, therefore, the content of P and S in steel is reduced as much as possible. Preferably, the present invention limits the mass percent of P and S in the substrate layer to P≤0.02% and S≤0.015%.

It should also be noted that in the technical solution of the present invention, due to different chemical element contents of the substrate layer and the stainless steel clad layer, in the cladding interface between the substrate layer and the stainless steel clad layer in the thickness direction, elements with a higher content diffuse to the side having elements with a lower content, and therefore form transition layers penetrating into the upper and lower sides of the substrate layer, as well as the surfaces of the stainless steel clad layer contacted with the substrate layer for 0-50 μm. The average composition of each element in the transition layers is between the corresponding composition of the element in the substrate layer and the corresponding composition of the element in the stainless steel clad layer in a gradient transition, for example, alloying elements with a higher mass percent (such as Cr, Ni) in the stainless steel clad layer diffuse to the substrate layer, and carbon with a higher mass percent in the substrate layer diffuses to the stainless steel clad layer, and therefore the average compositions of C, Cr and Ni in the transition layers are between those in the stainless steel clad layer and the substrate layer.

Further, in the high-strength double-sided stainless steel clad sheet of the present invention, the chemical elements in the substrate layer also satisfy: 2.7×C+0.4×Si+Mn≤1.25, wherein. C, Si and Mn each present respective mass percent of themself.

In the technical solution of the present invention, the chemical elements in the substrate layer also need to satisfy 2.7×C+0.4×Si+Mn≤1.25, wherein C, Si and Mn each represent respective mass percent of themself, and the value which is substituted into the above limiting formula is the value before the percent sign ("%"), for example, when the mass percent of C is 0.1%, the mass percent of Si is 0.2%, and the mass percent of Mn is 0.7%, the values which are substituted into the formula are 0.1, 0.2 and 0.7 respectively, and the calculation should be 2.7×C+0.4×Si+Mn=2.7×0.1+0.4×0.2+0.7=1.05≤1.25. In the process of obtaining the steel substrate, the formula can ensure that the substrate obtains the microstructure of ferrite+pearlite+bainite, or ferrite+pearlite+bainite+widmanstatten in a certain process window range.

Furthermore, in the high-strength double-sided stainless steel clad sheet of the present invention, the microstructure of the substrate layer is ferrite pearlite+bainite, or ferrite+pearlite bainite+widmanstatten, wherein the phase proportion of the bainite is ≤20%, and the phase proportion of the widmanstatten is ≤10%.

It should be noted that in the technical solution of the present invention, because the transition layers exist on the upper and lower surfaces of the substrate layer, carbon-poor zones caused by the diffusion of carbon exist in the range of 0-100 μm on the upper and lower surfaces of the substrate layer in the thickness direction of the substrate layer, and forming a ferrite zone with a thickness of 50-100 μm in the substrate layer, and the substrate and the clad sheet are metallurgically bonded.

Further, in the high-strength double-sided stainless steel clad Sheet of the present invention, ferrite in the microstructure of the substrate layer having a grain size number≥grade 7.

Further, in the high-strength double-sided stainless steel clad sheet of the present invention, the yield strength at room temperature is ≥300 MPa, the elongation at room temperature is ≥30%, and the value of yield platform during mechanical stretching is ≤2.0%.

Further, in the high-strength double-sided stainless steel clad sheet of the present invention, the stainless steel clad layer is an austenitic stainless steel clad layer.

Further, in the high-strength double-sided stainless steel clad sheet of the present invention, the austenitic stainless steel is Cr—Ni based stainless steel or Cr—Ni—Mo based stainless steel.

It should be noted that in the technical solution of the present invention, since the transition layers also exist in the stainless steel clad layer, in the thickness direction of the stainless steel clad layer, a chromium-poor zone caused by the diffusion of chromium to the substrate layer exists in the range of 0-20 μm on the side of the stainless steel clad layer near the substrate layer, but the microstructure is still austenite.

Further, in the high-strength double-sided stainless steel clad sheet of the present invention, the total thickness of the double-sided stainless steel clad layer accounts for 10%-30% of the total thickness of the high-strength double-sided stainless steel clad sheet, and the stainless steel clad layer on the upper and lower surfaces of the substrate layer is set to be symmetrical or asymmetrical in thickness.

Correspondingly, another objective of the present invention is to provide a manufacturing method for the above-mentioned high-strength double-sided stainless steel clad sheet. The high-strength double-sided stainless steel clad sheet obtained by the manufacturing method has high strength, good surface quality and corrosion resistance, is suitable for applications in panels, storage tanks and other fields, and saves raw material alloy resources, reduces use cost.

In order to achieve the above objective of the present invention, the present invention proposes a manufacturing method for the above-mentioned high-strength double-sided stainless steel clad sheet, which includes the steps:
(I) obtaining a substrate layer and a stainless steel clad layer; wherein the substrate layer includes, in mass percent, the chemical elements: C: 0.03-0.12%, 0<Si≤0.30%, Mn: 1.0%, Al: 0.02-0.04%, Ti: 0.01-0.03%, Nb: 0.005-0.020%, and N: 0.003-0.006%, with the balance being iron and other inevitable impurities;
(2) billet making;
(3) clad-rolling;
(4) solution annealing and pickling treatment: controlling a solution temperature to be 950-1020° C., and then cooling down to room temperature at an average cooling rate of 20-50° C./s.

In the manufacturing method of the present invention, in step (1), the stainless steel clad layer can be obtained by using the process of prior art, for example, Cr—Ni or Cr—Ni—Mo based austenitic stainless steel is subjected to steelmaking, continuous casting, rolling, solution annealing, precision cutting, and pickling to make the stainless steel clad layer to be used in the subsequent billet making process. In addition, in some embodiments, a substrate layer billet can be obtained first, and then the substrate layer billet can be used as the substrate layer to make assemble billet with the stainless steel clad layer in the subsequent steps; or the substrate layer billet can be obtained first, and then the substrate layer billet is subjected to cogging and rolling to obtain a substrate layer steel sheet, which is used as the substrate layer to make assemble billet with the stainless steel clad layer in the subsequent steps.

In addition, in the manufacturing method of the present invention, in step (2), in some preferred embodiments, pretreatment is performed before the billet making to ensure that there is no contamination on the stainless steel clad surface.

It should be noted that in the manufacturing method of the present invention, in step (4), the solution temperature is controlled to be 950-1020° C. The reason is when the solution temperature is lower than 950° C., recrystallization and softening of austenitic stainless steel of the stainless steel clad layer cannot occur sufficiently, and the carbides that partially precipitate cannot be sufficiently solution treated; and when the solution treatment temperature is higher than 1020° C., the carbon steel grain structure of the substrate layer may grow rapidly, and in the subsequent rapid cooling process, it is easy to form a large amount of widmanstatten structure. In addition, controlling the cooling rate after solution treatment in the range of 20-50° C./s, on one hand, can ensure that the carbides that are dissolved in the stainless steel clad layer may not precipitate during subsequent cooling, and on the other hand, can ensure that the microstructure of the substrate layer is ferrite±pearlite a small amount of bainite, and avoid the appearance of martensite structure, thereby ensuring good comprehensive mechanical properties of the high-strength double-sided stainless steel clad sheet of the present invention.

Further, in the manufacturing method of the present invention, after step (4), the method further includes:
(5) cold rolling; and
(6) solution annealing, pickling, and leveling treatment: controlling the solution temperature to be 950-1020° C., and then cooling down to room temperature at an average cooling rate of 20-50° C./s.

In the manufacturing method of the present invention, in step (6), the solution temperature is controlled to be 950-1020° C. The reason is when the solution temperature is lower than 950° C., recrystallization and softening of austenitic stainless steel of the stainless steel clad layer cannot occur sufficiently, and the carbides that partially precipitate cannot be sufficiently solution treated; and when the solution temperature is higher than 1020° C., the carbon steel grain structure of the substrate layer may grow rapidly, and in the subsequent rapid cooling process, it is easy to form a large amount of widmanstatten structure. In addition, controlling the cooling rate after solution treatment in the range of 20-50° C./s, on one hand, can ensure that the carbides that are dissolved in the stainless steel clad layer may not precipitate during subsequent cooling, and on the other hand, can ensure that the microstructure of the substrate layer is ferrite+pearlite+a small amount of bainite and avoid the appearance of martensite structure, thereby ensuring good comprehensive mechanical properties of the high-strength double-sided stainless steel Clad sheet of the present invention.

After steps (5) and (6), a thinner and lower surface roughness cold-rolled stainless steel clad sheet can be obtained.

Compared with the prior art, the high-strength double-sided stainless steel clad sheet and the manufacturing method therefor have the following beneficial effects.
1. From the perspective of chemical composition, the high-strength double-sided stainless steel clad sheet of the present invention adopts a low-carbon, and titanium, niobium, and aluminum microalloyed composition design to ensure that the substrate layer has a higher austenite recrystallization temperature. At the same time, it is ensured that the austenite grains in the substrate layer will not fully grow under the condition of higher solution treatment temperature, and then ensure that the ferrite+pearlite+bainite structure can be obtained after the substrate layer is rapidly cooled. The grain size number of the ferrite is ≥grade 7, and the phase proportion of the bainite is ≤20%, so that the high-strength double-sided stainless steel clad sheet of the present invention has the yield strength of 300 MPa or above.
2. From the perspective of production process, the manufacturing method for the high-strength double-sided stainless steel clad sheet of the present invention adopts high-temperature solution treatment and rapid cooling processes to ensure the recrystallization and softening of the stainless steel clad layer and the homogenization of the structure, and avoid the precipitation of carbides, so as to ensure that the stainless steel clad layer has excellent corrosion resistance.
3. From the perspective of product performance, the high-strength double-sided stainless steel clad sheet of the present invention has high strength, good surface quality and corrosion resistance; the yield strength at room temperature is ≥300 MPa, and the elongation at room temperature is ≥30%, the value of yield platform during mechanical stretching is ≤2.0%; and the comprehensive performance is good, the high-strength double-sided stainless steel clad sheet can meet the requirements of the applications in panels, storage tanks and other fields, and is suitable for wide industrial applications.

DETAILED DESCRIPTION

The following will further explain and describe the high-strength double-sided stainless steel clad sheet and a manufacturing method therefor of the present invention with reference to the drawings attic description and specific embodiments, but the explanation and description do not improperly limit the technical solution of the present invention.

Examples 1-8 and Comparative Example 1

Table 1-1 and Table 1-2 list the mass percent of each chemical element in substrate layers of high-strength double-sided stainless steel clad sheets and models of stainless steel clad layers of Examples 1-8 and Comparative Example 1.

It should be noted that the stainless steel clad layers of the high-strength double-sided stainless steel clad sheets of Examples 1-8 and Comparative Example 1 are all stainless steels that are available in the prior art. Therefore, Tables 1-1 and 1-2 only list the specific models of the stainless steel clad layers, and the composition of various chemical elements will not be recorded.

TABLE 1-1

| | | \multicolumn{9}{c}{(wt %, the balance being Fe and other inevitable impurities excluding S and P)} |
|---|---|---|---|---|---|---|---|---|---|---|
| | | C | Si | Mn | P | S | Ti | Nb | Al | N |
| Example 1 | substrate layer | 0.030 | 0.30 | 0.78 | 0.020 | 0.015 | 0.025 | 0.008 | 0.03 | 0.004 |
| | stainless steel clad layer | \multicolumn{9}{l}{Model: 304, Cr—Ni based austenitic stainless steel clad layer} |
| Example 2 | substrate layer | 0.070 | 0.23 | 0.82 | 0.011 | 0.002 | 0.016 | 0.010 | 0.02 | 0.003 |
| | stainless steel clad layer | \multicolumn{9}{l}{Model: 304L, Cr—Ni based austenitic stainless steel clad layer} |
| Example 3 | substrate layer | 0.040 | 0.02 | 0.32 | 0.014 | 0.008 | 0.030 | 0.005 | 0.04 | 0.006 |
| | stainless steel clad layer | \multicolumn{9}{l}{Model: 304, Cr—Ni based austenitic stainless steel clad layer} |
| Example 4 | substrate layer | 0.042 | 0.02 | 0.36 | 0.011 | 0.008 | 0.030 | 0.005 | 0.03 | 0.004 |
| | stainless steel clad layer | \multicolumn{9}{l}{Model: 304L, Cr—Ni based austenitic stainless steel clad layer} |
| Example 5 | substrate layer | 0.100 | 0.18 | 0.82 | 0.013 | 0.003 | 0.010 | 0.020 | 0.03 | 0.004 |
| | stainless steel clad layer | \multicolumn{9}{l}{Model: 304L, Cr—Ni based austenitic stainless steel clad layer} |
| Example 6 | substrate layer | 0.044 | 0.05 | 0.20 | 0.013 | 0.002 | 0.012 | 0.007 | 0.04 | 0.005 |
| | stainless steel clad layer | \multicolumn{9}{l}{Model: 304, Cr—Ni based austenitic stainless steel clad layer} |
| Example 7 | substrate layer | 0.120 | 0.21 | 0.84 | 0.010 | 0.005 | 0.015 | 0.015 | 0.03 | 0.005 |
| | stainless steel clad layer | \multicolumn{9}{l}{Model: 316L, Cr—Ni—Mo based austenitic stainless steel clad layer} |
| Example 8 | substrate layer | 0.062 | 0.17 | 1.00 | 0.010 | 0.001 | 0.018 | 0.008 | 0.03 | 0.004 |
| | stainless steel clad layer | \multicolumn{9}{l}{Model: 316L, Cr—Ni—Mo based austenitic stainless steel clad layer} |
| Comparative Example 1 | substrate layer | 0.003 | 0.02 | 0.15 | 0.010 | 0.007 | 0.050 | 0.006 | 0.04 | 0.004 |
| | stainless steel clad layer | \multicolumn{9}{l}{Model: 304L, Cr—Ni based austenitic stainless steel clad layer} |

TABLE 1-2

(wt %, the balance being Fe and other inevitable impurities excluding S and P)

| | | $2.7 \times C + 0.4 \times Si + Mn$ | Microstructure and phase proportion | Ferrite grain size number | Thickness (stainless steel clad layer-substrate layer-stainless steel clad layer, mm) | Percent of total thickness of double-sided stainless steel clad layers in full thickness of high-strength double-sided stainless steel clad sheet (%) |
|---|---|---|---|---|---|---|
| Example 1 | substrate layer stainless steel clad layer | 0.98 | F + P + 10% B / | Grade 8 | 0.3-2.4-0.3 | 20 |
| Example 2 | substrate layer stainless steel clad layer | 1.10 | F + P + 15% B / | Grade 8 | 0.15-1.2-0.15 | 20 |
| Example 3 | substrate layer stainless steel clad layer | 0.44 | F + P + 10% B / | Grade 8.5 | 0.1-0.8-0.1 | 20 |
| Example 4 | substrate layer stainless steel clad layer | 0.48 | F + P + 5% B / | Grade 7 | 0.3-2.4-0.3 | 20 |
| Example 5 | substrate layer stainless steel clad layer | 1.16 | F + P + 15% B + 5% W / | Grade 7 | 0.4-3.2-0.4 | 20 |
| Example 6 | substrate layer stainless steel clad layer | 0.34 | F + P + 3% B / | Grade 8.5 | 0.1-1.8-0.1 | 10 |
| Example 7 | substrate layer stainless steel clad layer | 1.25 | F + P + 20% B + 10% W / | Grade 7 | 0.45-2.1-0.45 | 30 |
| Example 8 | substrate layer stainless steel clad layer | 1.24 | F + P + 15% B / | Grade 7.5 | 0.12-0.96-0.12 | 20 |
| Comparative Example 1 | substrate layer stainless steel clad layer | 0.17 | F / | Grade 7.5 | 0.15-0.7-0.15 | 30 |

Note:
C, Si and Mn in the formula of 2.7 × C + 0.4 × Si + Mn each represent respective mass percent of the element, and the value which is substituted into the above formula should the value before the percent sign ("%"), for example, when the mass percent of C is 0.1%, the mass percent of Si is 0.2%, and the mass percent of Mn is 0.7%, the values which are substituted into the formula are 0.1, 0.2, and 0.7 respectively, and the calculated value is 2.7 × C + 0.4 × Si + Mn = 2.7 × 0.1 + 0.4 × 0.2 + 0.7 = 1.05.

It should be noted that in Table 1-2, F represents ferrite, P represents pearlite, B represents bainite, and % V represents widmanstatten structure.

The high-strength double-sided stainless steel clad sheets of Examples 1-8 and Comparative Example 1 are prepared by the following steps (the specific process parameters are listed in Table 2):

(1) According to Table 1-1 and Table 1-2, the substrate layer and the stainless steel clad layer are obtained, wherein austenitic stainless steel is subjected to steel-making, continuous casting, rolling, solution annealing, precision cutting, and pickling to make to make the stainless steel clad layer to be used in the subsequent billet making process. In addition, in some embodiments, a substrate layer billet can be obtained first, and then the substrate layer billet can be used as the substrate layer to make assemble billet with the stainless steel clad layer in the subsequent steps; or the substrate layer billet can be obtained first, and then the substrate layer billet is subjected to cogging and rolling to obtain a substrate layer steel sheet, which is used as the substrate layer to make assemble billet with the stainless steel clad layer in the subsequent steps.

(2) Billet making: pretreatment is performed before billet making to ensure that there is no contamination on the stainless steel composite surface.

(3) Clad rolling: conventional hot rolling methods in the prior art are adopted to make hot rolled coils with different target thicknesses.

(4) Solution annealing and pickling treatment: the solution temperature is controlled to be 950-1020° C., then cooled down to room temperature at an average cooling rate of 20-50° C./s, blasting and pickling are performed to obtain the high-strength double-sided stainless steel clad sheet of which the surface status is named hot solution annealing and pickling surface NO. 1.

(5) Cold rolling: a Sendzimir 20-high rolling mill is used to roll onto cold rolled coils with different target thicknesses.

(6) Solution annealing, pickling and leveling treatment: the solution temperature is controlled to be 950-1020° C., and then cooled down to room temperature at an average cooling rate of 20-50° C./s to obtain the high-strength double-sided stainless steel clad sheet of which the surface status is named cold solution annealing and pickling surface 2B.

Table 2 Specific process parameters of the manufacturing methods for the high-strength double-sided stainless steel clad sheets of Examples 1-8 and Comparative Example 1.

| | Step (4) | | Step (6) | | |
|---|---|---|---|---|---|
| No. | Solution temperature (° C.) | Average cooling rate (° C./s) | Solution temperature (° C.) | Average cooling rate (° C./s) | Surface status |
| Example 1 | 950 | 35 | / | / | NO. 1 |
| Example 2 | 1000 | 30 | 1000 | 30 | 2B |
| Example 3 | 1000 | 30 | 960 | 50 | 2B |
| Example 4 | 1000 | 30 | / | / | NO. 1 |
| Example 5 | 1010 | 33 | / | / | NO. 1 |

-continued

|  | Step (4) | | Step (6) | | |
| --- | --- | --- | --- | --- | --- |
| No. | Solution temperature (° C.) | Average cooling rate (° C./s) | Solution temperature (° C.) | Average cooling rate (° C./s) | Surface status |
| Example 6 | 1000 | 20 | 950 | 20 | 2B |
| Example 7 | 1020 | 25 | / | / | NO. 1 |
| Example 8 | 1000 | 20 | 1000 | 22 | 2B |
| Comparative Example 1 | 1000 | 30 | 900 | 30 | 2B |

It should be noted that in the manufacturing methods for the high-strength double-sided stainless steel clad sheets of Examples 1-8 and Comparative Example 1, if the surface status of the finally obtained high-strength double-sided stainless steel clad sheet is hot solution annealing and pickling surface NO. 1, the product was not processed in step (5) and step (6). If the surface status of the finally obtained high-strength double-sided stainless steel clad sheet is cold solution annealing and pickling surface 2B, the product went through processing in step (5) and step (6).

The mechanical properties of the high-strength double-sided stainless steel clad sheets of Examples 1-8 and Comparative Example 1 are tested to specifically test the value of yield platform during mechanical stretching, yield strength at room temperature, tensile strength at room temperature, and elongation at room temperature, wherein the mechanical tensile properties are tested according to the GB/T 6396-2008 composite steel sheet mechanical and technological property test method. The mechanical properties test results are listed in Table 3.

TABLE 3

| | Mechanical tensile properties at room temperature | | | |
| --- | --- | --- | --- | --- |
| No. | Yield strength (MPa) | Tensile strength (MPa) | Elongation rate ($A_{50}$, %) | Value of yield platform (%) |
| Example 1 | 355 | 510 | 39.0 | 0.5 |
| Example 2 | 390 | 540 | 36.0 | none |
| Example 3 | 375 | 553 | 32.0 | none |
| Example 4 | 375 | 505 | 38.0 | 0.5 |
| Example 5 | 420 | 560 | 30.0 | none |
| Example 6 | 300 | 480 | 33.0 | 2.0 |
| Example 7 | 385 | 590 | 31.0 | none |
| Example 8 | 405 | 530 | 34.0 | none |
| Comparative Example 1 | 217 | 439 | 48.0 | none |

It can be seen from Table 3 that the high-strength double-sided stainless steel clad sheets of Examples 1-8 have the yield strength of 300 MPa or above, which is 83-203 MPa higher than the yield strength of the high-strength double-sided stainless steel clad sheet of Comparative Example 1, and have better surface quality, which meets the requirements of market users for good surface quality and higher yield strength.

Figure 1:
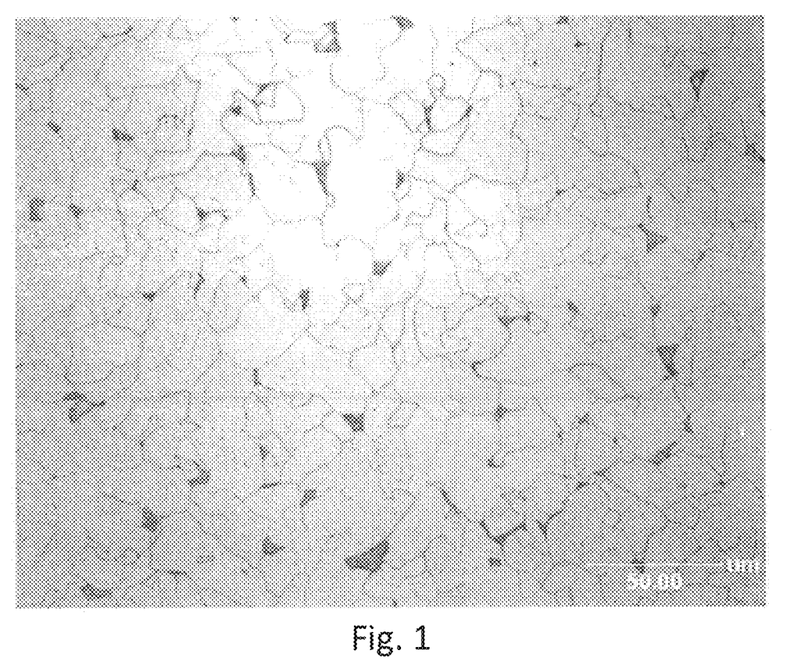
FIG. 1 schematically shows the microstructure of a substrate layer of a high-strength double-sided stainless steel clad sheet of Example 4 of the present invention.

It can be seen from FIG. 1 that the microstructure of the substrate layer of the high-strength double-sided stainless steel clad sheet of Example 4 is F+P+B, and the grain size of F is about grade 7.

Figure 2:
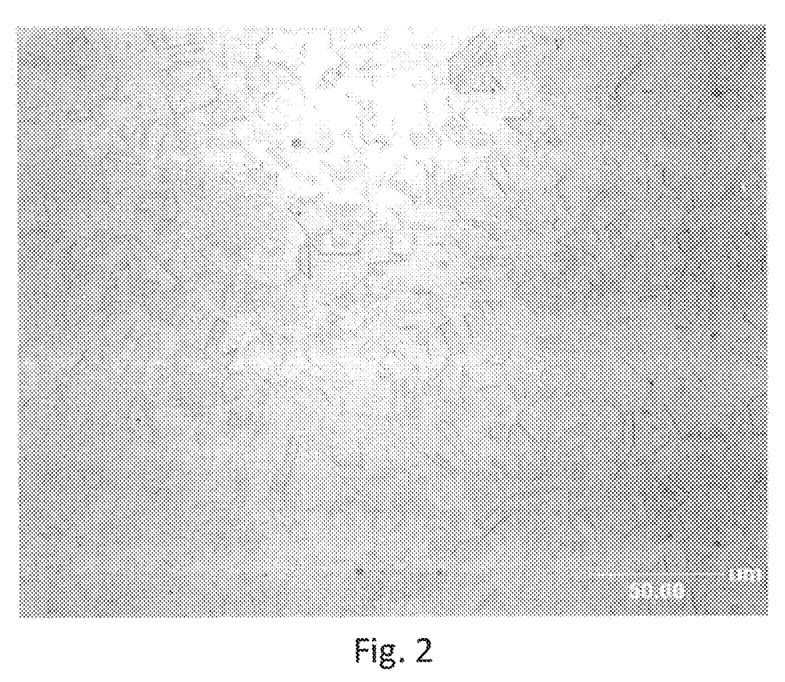
FIG. 2 schematically shows the microstructure of a stainless steel clad layer of the high-strength double-sided stainless steel clad sheet of Example 4 of the present invention, and there is no carbide precipitation.

It can be seen from FIG. 2 that the microstructure of the stainless steel clad layer of the high-strength double-sided stainless steel clad sheet of Example 4 is a completely recrystallized austenite grain structure.

Figure 3:
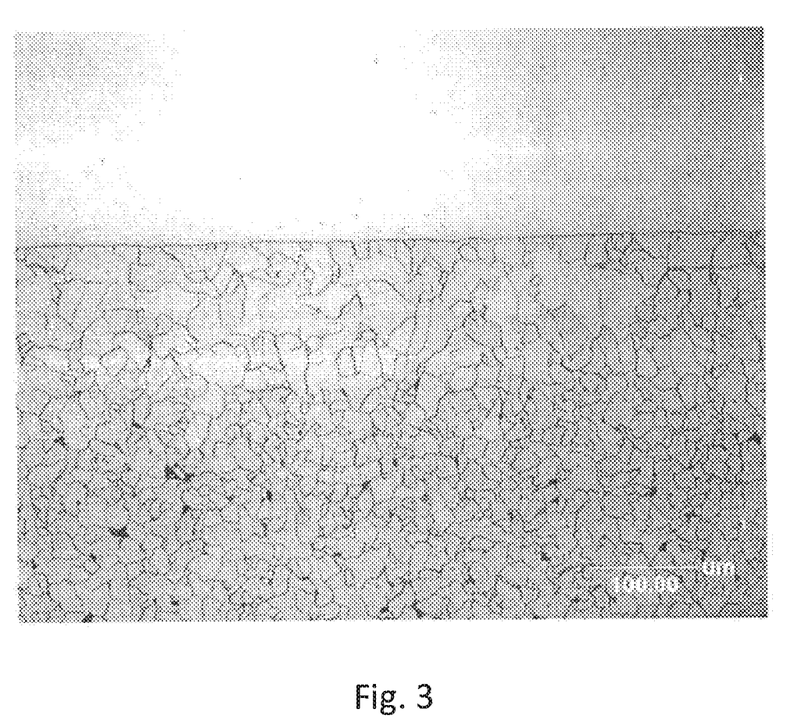
FIG. 3 schematically shows the microstructure around a bonding interface of the high-strength double-sided stainless steel clad sheet of Example 4 of the present invention.

It can be seen from FIG. 3 that at the bonding interface of the high-strength double-sided stainless steel clad sheet of Example 4, an obvious decarburization layer exists on the side close to the substrate layer, which is mainly caused by the diffusion of carbon atoms in the substrate layer to the side of the stainless steel clad layer. It shows that the substrate layer and the stainless steel clad layer in the high-strength double-sided stainless steel clad sheet of Example 4 form an obvious metallurgical bond.

It should be noted that the prior art part of the protection scope of the present invention is not limited to the Examples given in this application document, and all prior art that does not contradict the solution of the present invention, including but not limited to, prior patent documents, prior publications, prior public uses, etc. can all be included in the protection scope of the present invention.

In addition, the combination of various technical features in the present invention is not limited to the combination described in the claims of the present invention or the combination described in the specific Examples. All technical features described in the present invention can be freely combined or combined in any way, unless there are contradictions between each other.

It should also be noted that the Examples listed above are only specific Examples of the present invention, Obviously, the present invention is not limited to the above Examples, and the subsequent similar changes or modifications that can be directly derived from or easily associated with the disclosure of the present invention by those skilled in the art should fall within the protection scope of the present invention.

The invention claimed is:

1. A double-sided stainless steel clad sheet, comprising a substrate layer and stainless steel clad layers clad-rolled on opposing surfaces of the substrate layer, wherein the substrate layer consists of, in mass percent, chemical elements: C: 0.03-0.12%, 0<Si≤0.30%, Mn: 0.2-1.0%, Al: 0.02-0.04%, Ti: 0.01-0.03%, Nb: 0.005-0.020%, and N: 0.003-0.006%, with the balance being iron and other inevitable impurities;
wherein the chemical elements in the substrate layer also satisfy:
2.7×C+0.4×Si+Mn≤1.25, and wherein C, Si and Mn each represent mass percent, respectively; and
wherein the microstructure of the substrate layer is ferrite+pearlite+bainite, or
ferrite+pearlite+bainite+widmanstatten,
where the phase proportion of bainite is from 3% to 20% and
the phase proportion of widmanstatten is 10% or less.

2. The double-sided stainless steel clad sheet of claim 1, wherein the ferrite in the microstructure of the substrate layer has a grain size number≥grade 7.

3. The double-sided stainless steel clad sheet of claim 1, wherein the clad sheet has a yield strength at room temperature of 300 MPa to 420 MPa, an elongation rate at room temperature of 30% to 48%, and a value of yield platform during mechanical stretching of ≤2.0%.

4. The double-sided stainless steel clad sheet of claim 1, wherein each stainless steel clad layer is an austenitic stainless steel clad layer.

5. The double-sided stainless steel clad sheet of claim 4, wherein austenitic stainless steel is Cr—Ni based stainless steel or Cr—Ni—Mo based stainless steel.

6. The double-sided stainless steel clad sheet of claim 1, wherein a combined thickness of the stainless steel clad layers accounts for 10%-30% of a full thickness of the double-sided stainless steel clad sheet, and the stainless steel clad layers on the opposing surfaces of the substrate layer are symmetrical or asymmetrical in thickness.

7. A manufacturing method for the double-sided stainless steel clad sheet of claim 1, comprising the steps of:
   (a) obtaining a substrate layer and a stainless steel clad layer;
   (b) billet making;
   (c) clad-rolling;
   (d) solution annealing and pickling treatment: controlling the solution temperature to be 950-1020° C., and then cooling down to room temperature at an average cooling rate of 20-50° C./s.

8. The manufacturing method of claim 7, wherein the average cooling rate in the step (d) is 20-35° C./s.

9. The manufacturing method of claim 7, further comprising the steps of:
   (e) cold rolling; and
   (f) solution annealing, pickling and leveling treatment: controlling the solution temperature to be from 950-1020° C., and then cooling down to room temperature at an average cooling rate of 20-50° C./s.

10. The manufacturing method of claim 9, wherein the solution temperature in step (f) is from 950-1000° C.

* * * * *